(12) United States Patent
Moon et al.

(10) Patent No.: US 11,764,412 B2
(45) Date of Patent: Sep. 19, 2023

(54) BATTERY PACK

(71) Applicant: Samsung SDI Co., Ltd., Yongin-si (KR)

(72) Inventors: Soodeok Moon, Yongin-si (KR); Younghwan Kwon, Yongin-si (KR); Chuljung Yun, Yongin-si (KR); Kyungho Cho, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 429 days.

(21) Appl. No.: 17/055,873

(22) PCT Filed: Apr. 12, 2019

(86) PCT No.: PCT/KR2019/004413
§ 371 (c)(1),
(2) Date: Nov. 16, 2020

(87) PCT Pub. No.: WO2019/221397
PCT Pub. Date: Nov. 21, 2019

(65) Prior Publication Data
US 2021/0226260 A1    Jul. 22, 2021

(30) Foreign Application Priority Data
May 15, 2018  (KR) .......................... 10-2018-0055655

(51) Int. Cl.
| | |
|---|---|
| *H01M 10/42* | (2006.01) |
| *H01M 10/48* | (2006.01) |
| *H01M 50/209* | (2021.01) |
| *H01M 50/298* | (2021.01) |
| *H01M 50/30* | (2021.01) |
| *H01M 50/516* | (2021.01) |
| *H01M 50/264* | (2021.01) |

(52) U.S. Cl.
CPC ......... *H01M 10/425* (2013.01); *H01M 10/48* (2013.01); *H01M 50/209* (2021.01);
(Continued)

(58) Field of Classification Search
CPC .................................................. H01M 10/425
See application file for complete search history.

(56) References Cited

U.S. PATENT DOCUMENTS

| | | | |
|---|---|---|---|
| 9,198,292 B2 | 11/2015 | Kim et al. | |
| 2012/0276419 A1* | 11/2012 | Park ..................... | H01M 50/211 429/7 |

(Continued)

FOREIGN PATENT DOCUMENTS

| | | |
|---|---|---|
| EP | 2 544 263 A1 | 1/2013 |
| EP | 2 842 797 A1 | 3/2015 |

(Continued)

OTHER PUBLICATIONS

International Search Report dated Jul. 18, 2019 in application No. PCT/KR2019/004413.

(Continued)

*Primary Examiner* — Brian R Ohara
*Assistant Examiner* — Michelle T Leonard
(74) *Attorney, Agent, or Firm* — Knobbe, Martens, Olson & Bear, LLP

(57) ABSTRACT

This application relates to a battery pack including a battery cell, a circuit board configured to collect state information about the battery cell, and a connection line configured to transmit the state information about the battery cell to the circuit board and including a link line and a board connection pad. The link line extends from a side of the battery cell toward the circuit board, and the board connection pad extends from a first end portion, to which the link line is connected, and is coupled to the circuit board while facing the circuit board. The board connection pad includes outer soldering portions formed in an outer region of the board connection pad and concave toward the outside of the board (Continued)

connection pad and a gas discharge hole formed in a closed loop shape in an inner region of the board connection pad.

20 Claims, 11 Drawing Sheets

(52) U.S. Cl.
CPC ......... *H01M 50/298* (2021.01); *H01M 50/30* (2021.01); *H01M 50/516* (2021.01); *H01M 50/264* (2021.01)

(56) References Cited

U.S. PATENT DOCUMENTS

| | | | |
|---|---|---|---|
| 2014/0335386 A1* | 11/2014 | Ikeya | ............... H01M 50/209 |
| | | | 429/53 |
| 2016/0372796 A1 | 12/2016 | Nishihara | |
| 2017/0271799 A1 | 9/2017 | Axelowitz et al. | |

FOREIGN PATENT DOCUMENTS

| | | |
|---|---|---|
| KR | 10-0824867 B1 | 4/2008 |
| KR | 10-0900570 B1 | 6/2009 |
| KR | 10-2012-0122860 | 11/2012 |
| KR | 10-2013-0006279 | 1/2013 |
| KR | 10-2013-0125334 A | 11/2013 |
| KR | 10-2014-0130357 | 11/2014 |
| KR | 10-2015-0070521 | 6/2015 |

OTHER PUBLICATIONS

Extended European search report dated Jan. 28, 2022 in corresponding European patent application No. 19803122.1, 8 pp.

Notice of Allowance dated May 18, 2023 in corresponding Korean patent application No. 10-2018-0055655.

* cited by examiner

BATTERY PACK

CROSS-REFERENCE TO RELATED APPLICATIONS

This application is a national phase of PCT Application No. PCT/KR2019/004413, filed on Apr. 12, 2019, which claims priority to Korean Patent Application No. 10-2018-0055655 filed on May 15, 2018, each of which is hereby incorporated by reference.

TECHNICAL FIELD

The present disclosure relates to a battery pack.

BACKGROUND ART

In general, secondary batteries refer to batteries that can be repeatedly charged and recharged unlike non-rechargeable primary batteries. Secondary batteries are used as energy sources of devices such as mobile devices, electric vehicles, hybrid vehicles, electric bicycles, or uninterruptible power supplies. Secondary batteries are individually used or secondary battery modules each including a plurality of secondary batteries connected as one unit are used according to the types of external devices using secondary batteries.

Unlike small mobile devices such as cellular phones each operable for a certain period of time using a single battery, devices such as electric vehicles or hybrid vehicles having long operation times and consuming large amounts of electricity may prefer battery modules each including a plurality of batteries to handle problems relating to power and capacity, and the output voltages or currents of battery modules may be increased by adjusting the number of batteries included in each battery module.

DESCRIPTION OF EMBODIMENTS

Technical Problem

An embodiment of the present disclosure includes a battery pack having a structure improved for stably maintaining electrical connection between a connection line and a circuit board with high reliability for transmitting state information about battery cells.

An embodiment of the present disclosure includes a battery pack configured to save manufacturing costs through simple manufacturing processes.

Solution to Problem

To solve the above-described problems and other problems, a battery pack of the present disclosure includes: a battery cell; a circuit board configured to collect state information about the battery cell; and a connection line configured to transmit the state information about the battery cell to the circuit board and including a link line and a board connection pad, wherein the link line extends from a side of the battery cell toward the circuit board, and the board connection pad extends from a first end portion, to which the link line is connected, and is coupled to the circuit board while facing the circuit board, wherein the board connection pad includes: outer soldering portions formed in an outer region of the board connection pad and concave toward the outside of the board connection pad; a gas discharge hole formed in a closed loop shape in an inner region of the board connection pad; and an inner soldering portion formed along the gas discharge hole.

For example, the board connection pad may include: a conductive pattern through which the state information about the battery cell is transmitted; and an insulating layer in which the conductive pattern is embedded for being insulated.

For example, the outer soldering portions and the inner soldering portion may be formed by the conductive pattern exposed from the insulating layer.

For example, the conductive pattern may be a one-piece conductive pattern connected to all the outer soldering portions and the inner soldering portion formed on the board connection pad.

For example, each of the outer soldering portions may be formed in a semicircular shape having a center outside the board connection pad.

For example, the inner region may be surrounded by the outer region and may be separated from the outside of the board connection pad.

For example, the gas discharge hole may be formed in an elongated shape in the inner region of the board connection pad in a connection direction of the link line.

For example, the gas discharge hole may be formed in an oval shape having a long axis in the connection direction of the link line.

For example, the outer region of the board connection pad may include: the first end portion; a slope portion sloped from the first end portion to increase an area of the board connection pad; a second end portion on a side opposite the first end portion in a connection direction of the link line; and a third end portion and a fourth end portion which connect the second end portion and the slope portion to each other.

For example, the outer soldering portions may be formed on the second end portion, the third end portion, and the fourth end portion.

For example, in the first end portion and the slope portion, an insulation-covered portion in which a conductive pattern of the board connection pad is covered with an insulating layer may be formed.

For example, the outer soldering portions may include a plurality of outer soldering portions formed on the second end portion.

For example, the outer soldering portions formed on the third and fourth end portions may be symmetric.

For example, a total number of the outer soldering portions formed on the third and fourth end portions may be less than a total number of the outer soldering portions formed on the second end portion.

For example, the outer soldering portions formed on the third and fourth end portions may overlap the inner soldering portion in the connection direction of the link line.

For example, a total number of the outer soldering portions, which are formed on the third and fourth end portions, and the inner soldering portion may be equal to a total number of the outer soldering portions formed on the second end portion.

For example, the outer soldering portions which are formed on the third and fourth end portions may not overlap the inner soldering portion in the connection direction of the link line.

For example, a total number of the outer soldering portions formed on the third and fourth end portions and a total number of inner soldering portions may each be equal to a total number of the outer soldering portions formed on the second end portion.

For example, the board connection pad may include a conductive pattern through which the state information about the battery cell is transmitted and an isolated pattern through which the state information about the battery cell is not transmitted, wherein the conductive pattern may include: a first conductive pattern which connects a first outer soldering portion formed on the second end portion to a first inner soldering portion surrounding a first gas discharge hole in the inner region; and a second conductive pattern which connects a second outer soldering portion formed on the second end portion to a second inner soldering portion surrounding a second gas discharge hole in the inner region, wherein the isolated pattern may include: a first isolated pattern which connects a third outer soldering portion formed on the second end portion to a fifth outer soldering portion formed on the third end portion; and a second isolated pattern which connects a fourth outer soldering portion formed on the second end portion to a sixth outer soldering portion formed on the fourth end portion.

For example, the board connection pad may include a conductive pattern through which the state information about the battery cell is transmitted, and the conductive pattern may include first and second conductive patterns separate from each other, wherein the first conductive pattern may connect together a first outer soldering portion formed on the second end portion, a third outer soldering portion formed on the third end portion, and a first inner soldering portion surrounding a first gas discharge hole in the inner region, and the second conductive pattern may connect together a second outer soldering portion formed on the second end portion, a fourth outer soldering portion formed on the fourth end portion, and a second inner soldering portion surrounding a second gas discharge hole in the inner region.

Advantageous Effects of Disclosure

According to an embodiment of the present disclosure, connection lines for transmitting state information about battery cells are designed to improve the coupling strength between the connection lines and a circuit board and stably maintain the coupling between the connection lines and the circuit board even when deformation such as battery cell swelling occurs between the battery cells and the circuit board.

In addition, reflow soldering for coupling connection lines to the circuit board, and reflow soldering for coupling circuit elements to the circuit board are integrated in a single process and are simultaneously performed through the single process, thereby streamlining manufacturing processes and reducing manufacturing costs.

BEST MODE

A battery pack of the present disclosure includes: a battery cell; a circuit board configured to collect state information about the battery cell; and a connection line configured to transmit the state information about the battery cell to the circuit board and including a link line and a board connection pad, wherein the link line extends from a side of the battery cell toward the circuit board, and the board connection pad extends from a first end portion, to which the link line is connected, and is coupled to the circuit board while facing the circuit board, wherein the board connection pad includes: outer soldering portions formed in an outer region of the board connection pad and concave toward the outside of the board connection pad; a gas discharge hole formed in a closed loop shape in an inner region of the board connection pad; and an inner soldering portion formed along the gas discharge hole.

MODE OF DISCLOSURE

Battery packs will now be described with reference to the accompanying drawings, in which preferable embodiments are shown.

Figure 1:
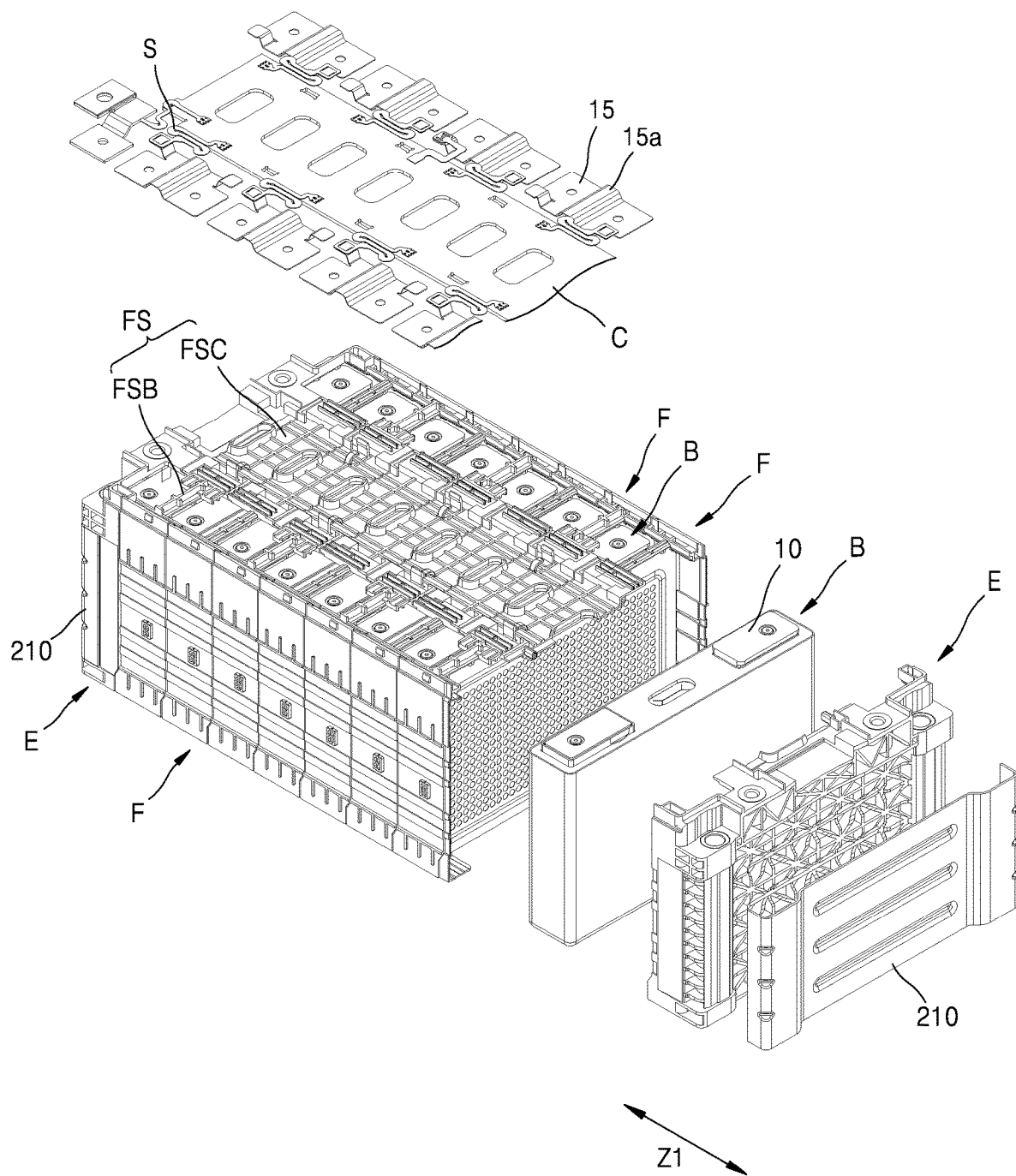
FIG. 1 is an exploded perspective view illustrating a battery pack according to an embodiment of the present disclosure.
Figure 2:
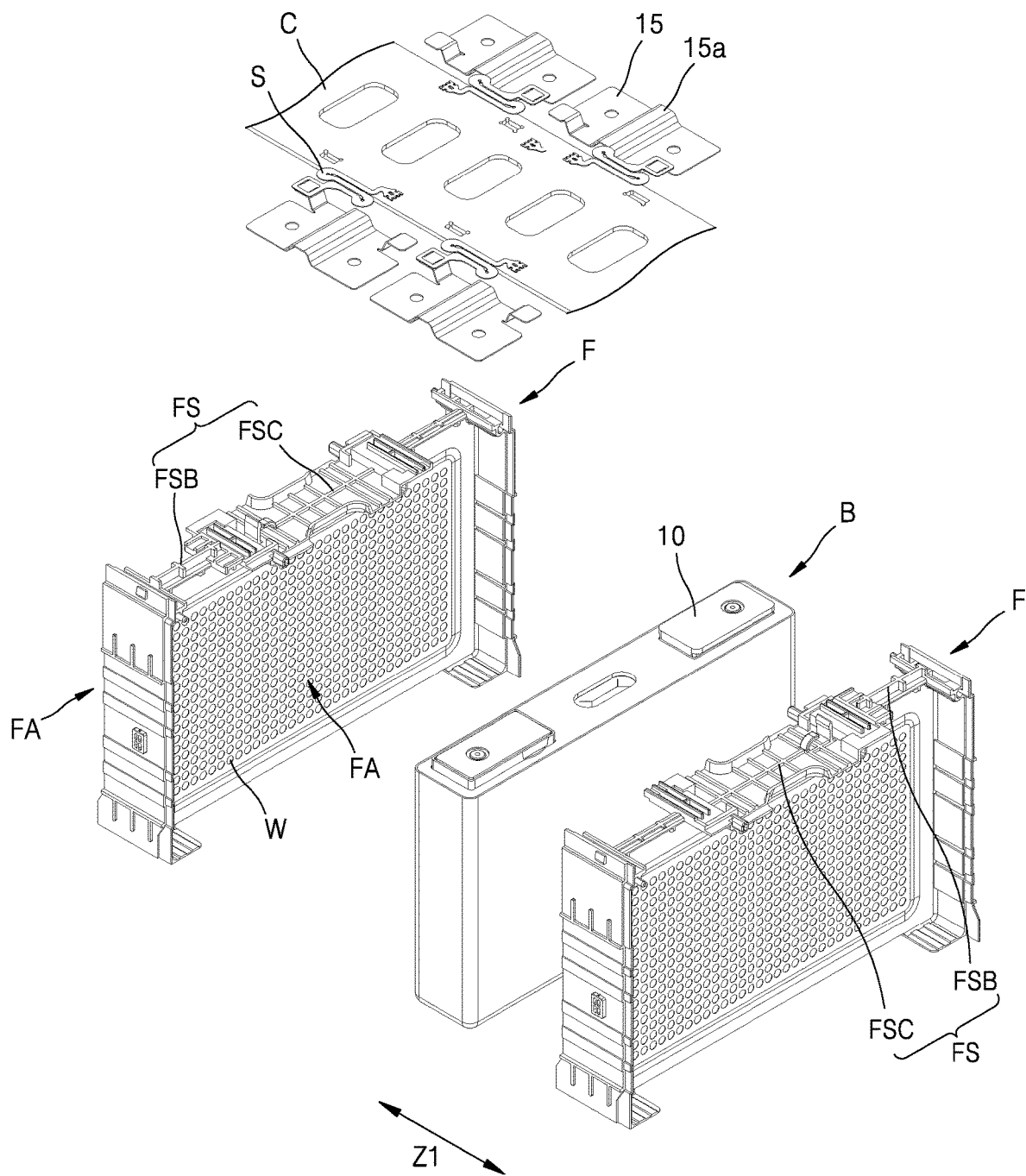
FIG. 2 is an exploded perspective view illustrating a portion of the battery pack shown in FIG. 1.
Figure 3:
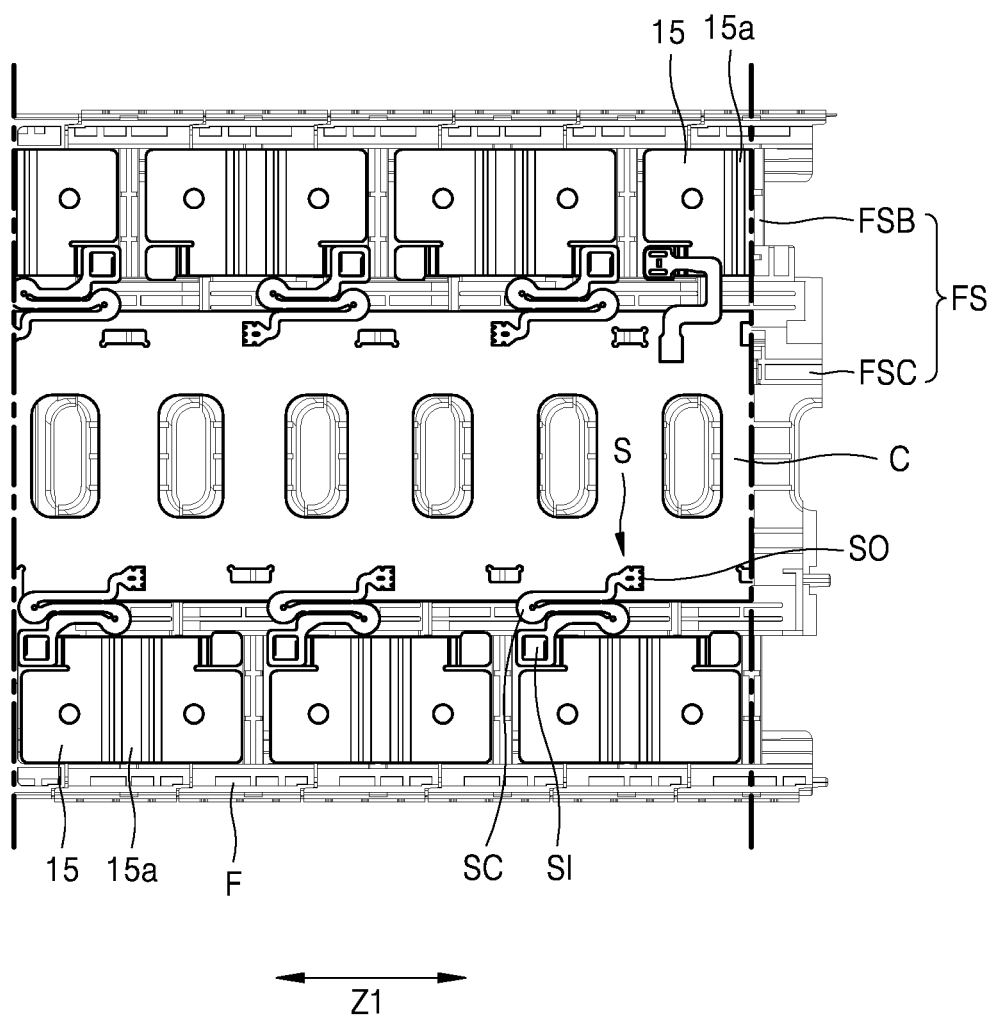
FIG. 3 is a plan view illustrating a portion of the battery pack shown in FIG. 1.
Figure 4:
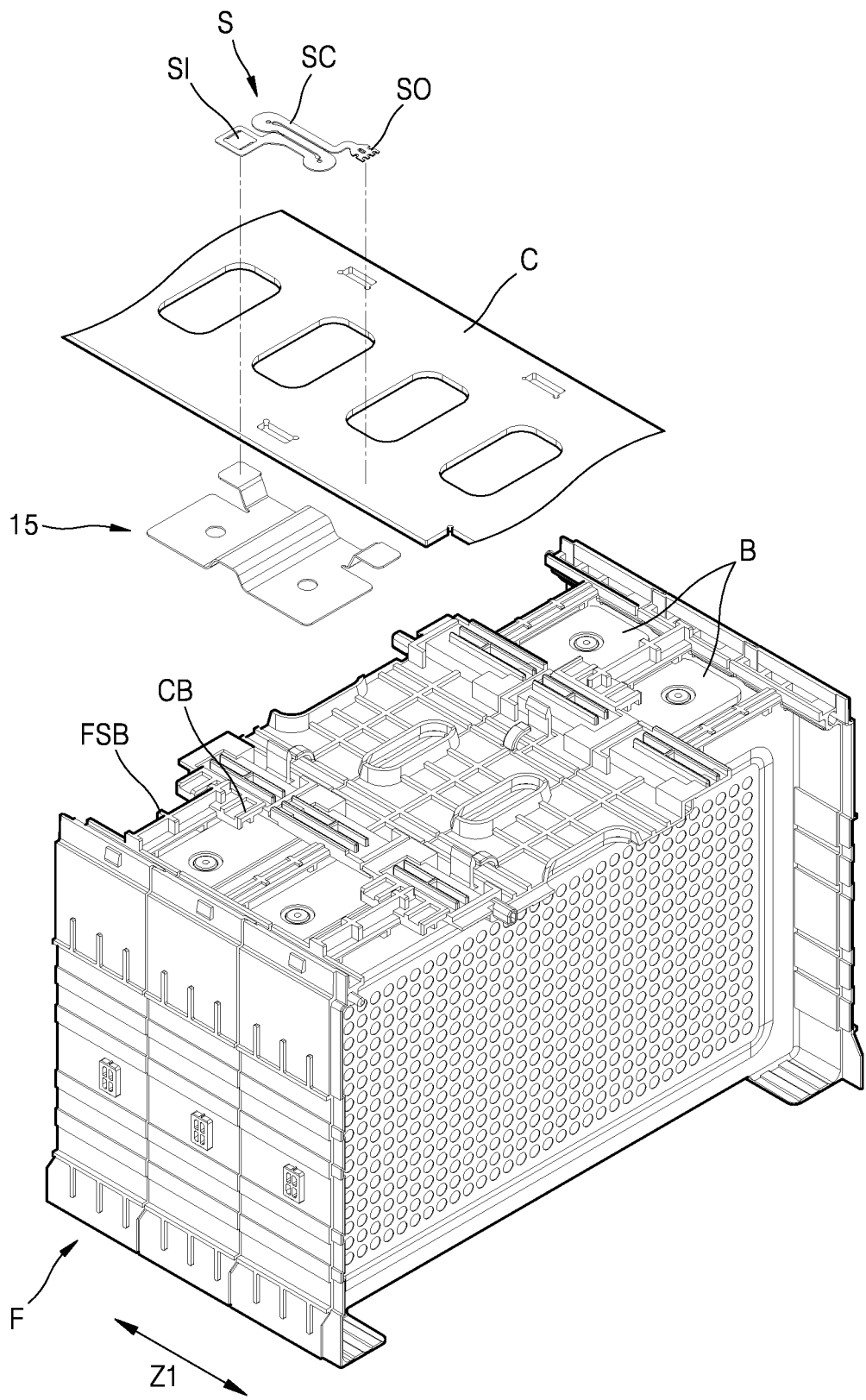
FIG. 4 is an exploded perspective view illustrating a portion of FIG. 3.

FIG. 1 is an exploded perspective view illustrating a battery pack according to an embodiment of the present disclosure. FIG. 2 is an exploded perspective view illustrating a portion of the battery pack illustrated in FIG. 1. FIG. 3 is a plan view illustrating a portion of the battery pack illustrated in FIG. 1. FIG. 4 is an exploded perspective view illustrating a portion of the battery pack illustrated in FIG. 3.

Referring to the drawings, the battery pack of the present disclosure includes: battery cells B; frames F arranged together with the battery cells B in a forward/backward direction (corresponding to a direction Z1) and coupled to each other to face each other with the battery cells B therebetween; and a circuit board C arranged on the frames F to collect state information about the battery cells B.

The battery cells B may be arranged in the forward/backward direction (corresponding to the direction Z1). In addition, the frames F may be arranged together with the battery cells B in the forward/backward direction (corresponding to the direction Z1) in such a manner that the frames F are coupled to each other with the battery cells B therebetween. For example, the frames F may be arranged in the forward/backward direction (corresponding to the direction Z1) in such a manner that each battery cell B is placed between neighboring frames F, and the neighboring frames F are coupled to each other to face each other.

Each of the frames F may define an accommodation portion FA surrounding the periphery of a battery cell B and extending along the periphery of the battery cell B to accommodate the battery cell B. More specifically, the frame F may extend along the periphery of the battery cell B while crossing upper, lower, and lateral sides of the battery cell B. The frame F may include: the accommodation portion FA as an inner region accommodating the battery cell B; and a support portion FS as an outer region on which objects making electrical connection with the battery cell B such as bus bars 15 and the circuit board C are supported. For example, the support portion FS may be formed on a portion of the frame F which crosses the upper side of the battery cell B on which electrodes 10 are formed. The frame F may have an inner side surrounding the battery cell B and an outer side forming the support portion FS, thereby providing a support base for objects such as the bus bars 15 and the circuit board C which make electrical connection with the battery cell B.

The frames F may be arranged in the forward/backward direction (corresponding to the direction Z1) in such a manner that each battery cell B is placed between neighboring frames F, and the neighboring frames F are coupled to each other to face each other. In other words, both sides of each of the battery cells B are surrounded by the frames F, and the frames F, which are arranged forward and backward, surround the outsides of the battery cells B placed between the frames F such that the frames F may form the exterior of the battery pack covering the battery cells B and may function as a housing protecting the battery cells B. In the battery pack including the battery cells B, the array of the frames F arranged in the forward/backward direction (corresponding to the direction Z1) may substantially form the exterior of the battery pack, and the battery cells B may be placed inside the array of the frames F and surrounded by the frames F.

The frames F and the battery cells B may be alternately arranged in the forward/backward direction (corresponding to the direction Z1), and each of the frames F may include different accommodation portions FA accommodating neighboring battery cells B. For example, each of the frames F may include different accommodation portions FA that accommodate different battery cells B arranged forward and backward, and the different accommodation portions FA may be separated from each other by a barrier wall W. In the frame F, the barrier wall W may be placed between the different accommodation portions FA to separate the accommodation portions FA from each other and may isolate the different battery cells Bs from electrical and thermal interference.

Each of the battery cells B may be connected to bus bars 15 for electrical connection with neighboring battery cells B, and the circuit board C may be connected to the battery cells B to obtain and collect state information such as voltage or temperature information about the battery cells B. In this case, the bus bars 15 and the circuit board C may be objects forming electrical connection with the battery cells B, and such objects may be supported on the support portions FS of the frames F.

The support portions FS of the frames F may include bus bar support portions FSB on which bus bars 15 are supported, and board support portions FSC on which the circuit board C is supported. The bus bar support portions FSB and the board support portions FSC may be provided on different positions of the support portions FS. For example, the bus bar support portions FSB may be provided on left or right peripheral portions of the frames F corresponding to the electrodes 10 of the battery cells B. The board support portions FSC may be provided on center portions of the frames F. The circuit board C supported on the board support portions FSC may be at center positions of the battery cells B such that the circuit board C may easily collect state information from a plurality of positions of the battery cells B. Connection lines S may be connected to the circuit board C to transmit state information from sides of the battery cells B, and since the circuit board C is placed at a center position, the distances between the circuit board C and the connection lines S connected to the plurality of positions from the circuit board C may be substantially uniform and may be balanced such that the electrical resistances of the connection lines S connected to the plurality of positions may be balanced to prevent signal distortion.

The bus bar support portions FSB and the board support portions FSC may have different widths. For example, the bus bar support portions FSB may be relatively narrow in order not to interfere electrical connection between the bus bars 15 and the battery cells B (specifically, the electrodes 10 of the battery cells B). The bus bar support portions FSB may support front and back end portions of the bus bars 15 which are located on both sides of bent portions 15*a* of the bus bars 15 and may insulate neighboring bus bars 15 from each other. The bus bar support portions FSB may support both end portions of the bus bars 15 and may electrically insulate neighboring bus bars 15 from each other such that both end portions of a bus bar 15 may not make contact with end portions of neighboring bus bars 15. The bus bar support portions FSB do not need to make physical contact with both end portions of the bus bars 15 as long as the bus bar support portions FSB are placed between neighboring bus bars 15 and electrically insulate the neighboring bus bars 15 from each other. Since it is sufficient that the bus bar support portions FSB are placed between the bus bars 15 neighboring each other to prevent electrical contact between the bus bars 15, the bus bar support portions FSB may have a relatively small width so as not to decrease the conduction area between the bus bars 15 and the electrodes 10 of the battery cells B. When the bus bar support portions FSB have a large width like the board support portions FSC, electrical contact between the bus bars 15 and the battery cells B (specifically, the electrodes 10 of the battery cells B) may be hindered, and the conduction area between the bus bars 15 and the battery cells B may be decreased, increasing the electrical resistance of an overall charge-discharge path and decreasing the electrical output power of the battery pack.

The bus bar support portions FSB may be provided on left and right peripheral positions of the support portions FS, which correspond to the electrodes 10 provided on left and right sides of the battery cells B in the width direction of the battery cells B. The frames F may be arranged in the forward/backward direction (corresponding to the direction Z1) in left-right reversed patterns, and in this case, the bus bar support portions FSB may be arranged in the forward/backward direction (corresponding to the direction Z1) along left and right edges in patterns alternating along the left and right edges. For example, the bus bar support portions FSB may be provided on left or right sides of the board support portions FSC provided at center positions of the frames F, and as the frames F are arranged in the forward/backward direction (corresponding to the direction Z1) in left-right reversed patterns, the bus bar support portions FSB may be arranged on the left and right sides of the board support portions FSC in the forward/backward direction (corresponding to the direction Z1).

The board support portions FSC have a relatively large width such that the circuit board C may be stably placed and supported on the board support portions FSC. The circuit board C may be placed on the board support portion FSC of each of the frames F, and the board support portions FSC of the frames F may be connected to each other in the forward/backward direction (corresponding to the direction Z1) to form a support surface widely extending in the forward/backward direction (corresponding to the direction Z1), thereby providing a support base for supporting the circuit board C. That is, while the board support portions FSC of the frames F support the circuit board C, the board support portions FSC of the frames F may be connected to each other in the forward/backward direction (corresponding to the direction Z1) to form a support surface widely extending in the forward/backward direction (corresponding to the direction Z1), and thus a support base for stably supporting the circuit board C may be provided.

The bus bars 15 are for electrically connecting the battery cells B neighboring each other, and the bus bars 15 may connect the battery cells B in series, parallel, or series-parallel to each other. The bus bars 15 may electrically connect the battery cells B to each other by electrically coupling the electrodes 10 of the battery cells B. More specifically, the bus bars 15 may connect the battery cells B in parallel to each other by connecting electrodes 10 of the battery cells B having the same polarity or in series to each other by connecting electrodes 10 of the battery cells B having different polarities.

The bus bars 15 may be arranged to face the electrodes 10 provided on upper surfaces of the battery cells B and may electrically connect the electrodes 10 of the battery cells B to each other. More specifically, based on the bent portions 15a provided at center positions of the bus bars 15, both sides of the bus bars 15 may be pointed toward and coupled to the electrodes 10 of the battery cells B. A plurality of bus bars 15 may be provided, and each of bus bar 15 may connect electrodes 10 of a pair of neighboring battery cells B.

The board support portions FSC may be placed at center positions between the bus bar support portions FSB provided at left and right peripheral portions. The circuit board C may be placed on the board support portions FSC. The circuit board C may include a plurality of conductive patterns (not shown) to collect state information about the battery cells B and transmit the state information to a battery management system (not shown). The circuit board C may be connected to the bus bars 15 used to electrically couple the battery cells B to each other and obtain information about the voltages of the battery cells B. Although not shown in the drawings, the circuit board C may be connected to thermistors (not shown) placed on the upper surfaces of the battery cells B to obtain information about the temperatures of the battery cells B.

The circuit board C may collect state information, for example, voltage and temperature information, from the battery cells B and may transmit the state information to a separate battery management system (not shown) such that the separate battery management system (not shown) may control charge-discharge operations of the battery cells B, or the charge-discharge operations of the battery cells B may be controlled by a battery management system together with the circuit board C.

The connection lines S which are flexible may be connected to the circuit board C as media for transmitting signals relating to battery cell state information. The connection lines S may be provided in the form of flexibly deformable films. Each of the connection lines S may include a cell connection pad SI connected to a side of a battery cell B (for example, a bus bar 15 electrically connected to the battery cell B), a board connection pad SO connected to the circuit board C, and a link line SC connecting the cell connection pad SI and the board connection pad SO to each other.

The cell connection pad SI may correspond to a portion receiving state information from the side of the battery cell B (for example, from the bus bar 15 electrically connected to the battery cell B), and the board connection pad SO may correspond to a portion through which the state information about the battery cell B is output to the circuit board C. The link line SC connecting the cell connection pad SI and the board connection pad SO to each other may be formed in a curved shape having curved portions and overlapping portions.

The cell connection pads SI of the connection lines S may be connected to sides of the battery cells B. More specifically, the cell connection pads SI of the connection lines S may be connected to the bus bars 15 electrically connecting the battery cells B neighboring each other, and voltage signals of the battery cells B may be received from the bus bars 15 through the cell connection pad SI. Although not shown in the drawings, according to another embodiment of the present disclosure, the cell connection pads SI may be connected to the thermistors (not shown) placed on the upper surfaces of the battery cells B, and temperature signals of the battery cells B may be received from the thermistors (not shown) through the cell connection pads SI. That is, the cell connection pads SI of the connection lines S may be connected to the battery cells B for acquiring state information such as the voltages or temperatures of the battery cells B, and for example, the cell connection pads SI may be connected to the bus bars 15 electrically connected to the battery cells B or the thermistors (not shown) thermally connected to the battery cells B.

The cell connection pads SI may be welded to sides (for example, the bus bars) of the battery cells B. For example, the cell connection pads SI may be ultrasonically welded to the bus bars 15 by placing the cell connection pads SI on the bus bars 15 and pressing an ultrasonic horn (not shown) against the cell connection pads SI to apply ultrasonic vibration to the cell connection pads SI. In another embodiment of the present disclosure, the cell connection pads SI and sides (for example, the bus bars 15) of the battery cells B may be coupled to each other using a conductive adhesive.

Each of the link lines SC, which connects the cell connection pad SI and the board connection pad SO to each other, may be formed in a curved shape having curved portions and overlapping portions. The battery pack may include the frames F facing each other and coupled to each other with the battery cells B therebetween in the forward/backward direction (corresponding to the direction Z1) in which the battery cells B are arranged. During the charge-discharge operations of the battery cells B, the battery cells B may undergo swelling, that is, expansion, in the forward/backward direction (corresponding to the direction Z1), and in this case, the frames F which are forwardly and backwardly coupled to each other with the battery cells B therebetween may slide in the forward/backward direction (corresponding to the direction Z1) and accommodate deformation caused by the swelling of the battery cells B.

When the battery cells B swell and expand in the forward/backward direction (corresponding to the direction Z1), the relative positions of the cell connection pads SI coupled to the bus bars 15 and the board connection pads SO coupled to the circuit board C may become farther from each other in the forward/backward direction (corresponding to the direction Z1). In this case, the link lines SC connecting the cell connection pads SI and the board connection pads SO may deform to accommodate the deformation in the forward/backward direction (corresponding to the direction Z1). In this case, since the link lines SC have a curved shape with curved portions and overlapping portions, the link lines SC may be easily deformed according to the relative positions of the cell connection pads SI and the board connection pads SO which are moved away from each other because of the swelling, and thus stress may be less accumulated in the link lines SC.

The board connection pads SO may be connected to pads (not shown) of the circuit board C, and electrical signals transmitted through the board connection pads SO may arrive at the conductive patterns (not shown) of the circuit board C via the pads (not shown) of the circuit board C. Specific structures of the board connection pads SO will be described later in more detail.

In FIG. 1, reference numerals E and 210 refer to end blocks and end plates, respectively. The end blocks E and the end plates 210 may be placed on outer sides of the outermost battery cells B to provide fastening force for physically restraining the battery cells B of the battery pack.

Figure 5:
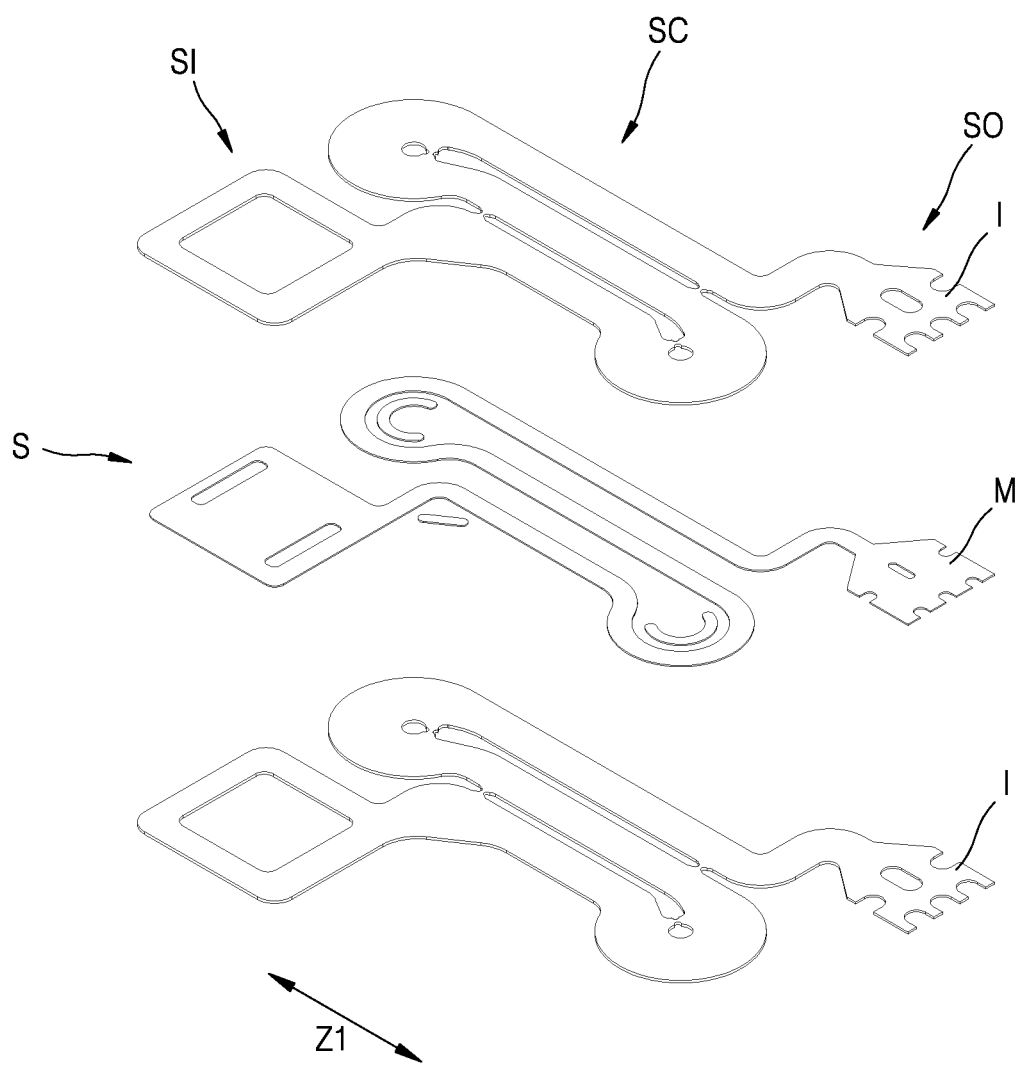
FIGS. 5 and 6 are an exploded perspective view and a plan view which illustrate a connection line shown in FIG. 4.
Figure 6:
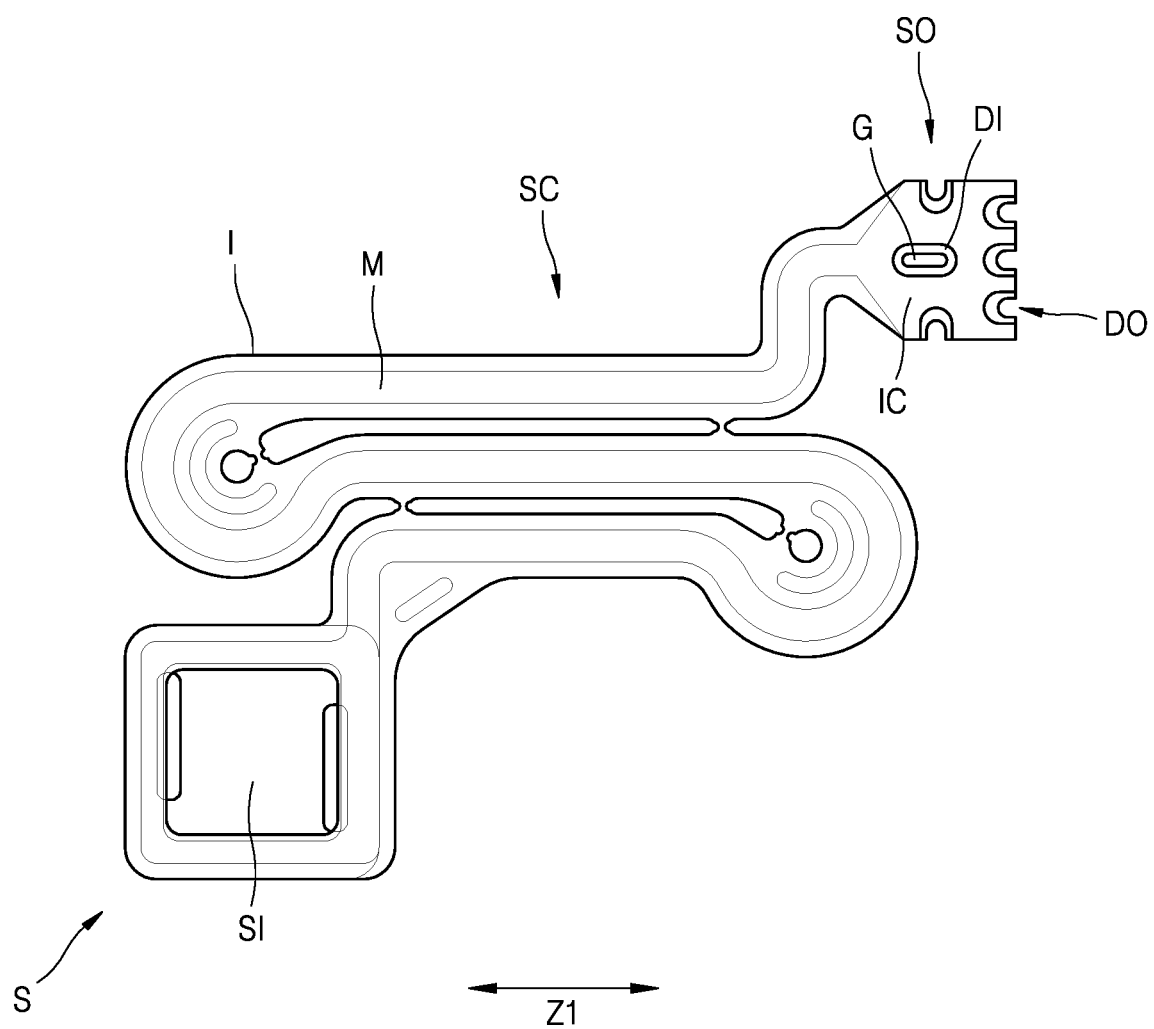

FIGS. 5 and 6 are an exploded perspective view and a plan view which illustrate a connection line S shown in FIG. 4.

Referring to the drawings, the connection line S may include: a conductive pattern M through which a signal providing state information about battery cells B such as voltage or temperature information is transmitted; and an insulating layer I in which the conductive pattern M is embedded. The insulating layer (I) may be formed on both surfaces of the conductive pattern M to insulate the conductive pattern M. The conductive pattern M may be formed in one piece across the entirety of the connection line S, which includes a cell connection pad SI and a board connection pad SO at both ends of the connection line S and a link line SC between the cell connection pad SI and the board connection pad SO, and the conductive pattern M may have a signal transmitting function to transmit state information about the battery cells B to the circuit board C.

The insulating layer (I) may be formed on both sides of the conductive pattern M in one piece across the entirety of the connection line S, which includes the cell connection pad SI and the board connection pad SO at both ends of the connection line S and the link line SC between the cell connection pad SI and the board connection pad SO, but the insulating layer (I) may expose the conductive pattern M at a portion at which the cell connection pad SI is connected to a side of the battery cells B (for example, a bus bar 15 connected to the battery cells B) and a portion at which the board connection pad SO is connected to the circuit board C such that the connection line S may be electrically connected to the side of the battery cells B (for example, the bus bar 15 connected to the battery cells B) and the circuit board C by performing a high-temperature thermal process such as welding or soldering between the side of the battery cells B (for example, the bus bar 15 connected to the battery cells B) and the portion of the conductive pattern M exposed from the insulating layer (I) and between the circuit board C and the portion of the conductive pattern M exposed from the insulating layer (I).

Referring to FIG. 6, the conductive pattern M exposed at the board connection pad SO from the insulating layer (I) may form soldering portions DO and DI, and the board connection pad SO and the circuit board C may be coupled to each other as solder melted through a high-temperature thermal process is solidified between the circuit board C and the soldering portions DO and DI. The soldering portions DO and DI of the board connection pad SO may include an outer soldering portion DO formed in an outer region of the board connection pad SO, and an inner soldering portion DI formed in an inner region of the board connection pad SO, more specifically in an inner region around a gas discharge hole G. An insulation-covered portion IC of the board connection pad SO at which the conductive pattern M is covered with the insulating layer (I) may not be directly coupled to the circuit board C, for example, in a state in which the insulation-covered portion IC is spaced apart from the circuit board C.

Figure 7:
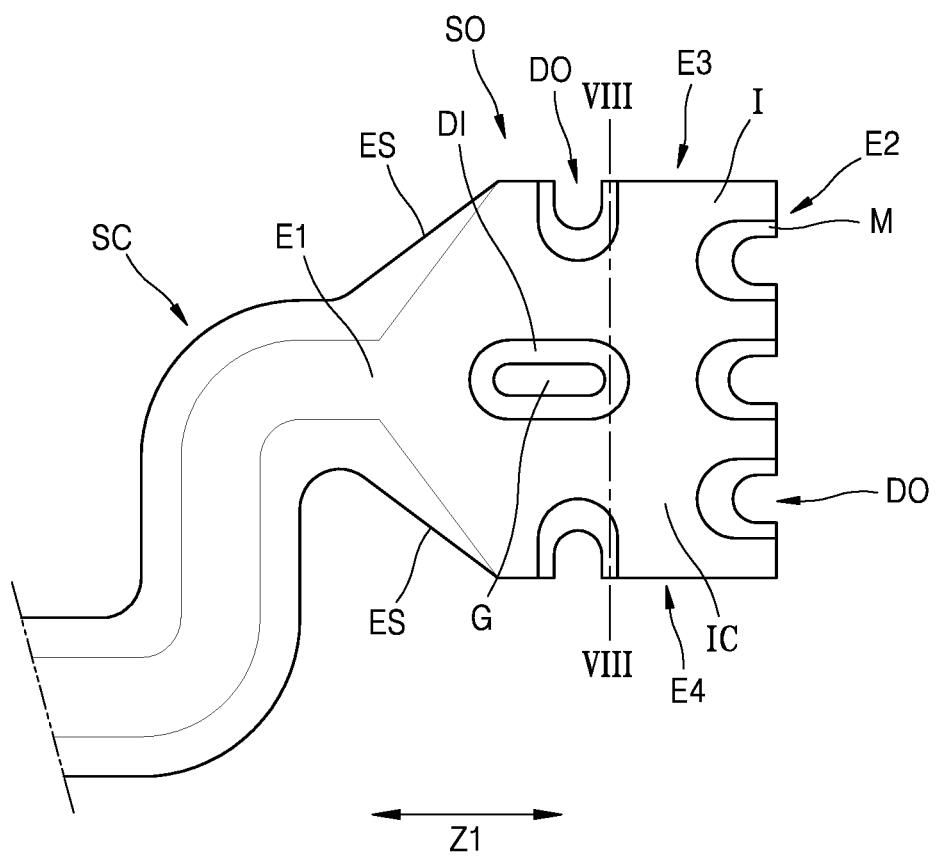
FIG. 7 is an enlarged view illustrating a portion of the connection line shown in FIG. 6, to show structure of a board connection pad.
Figure 8:
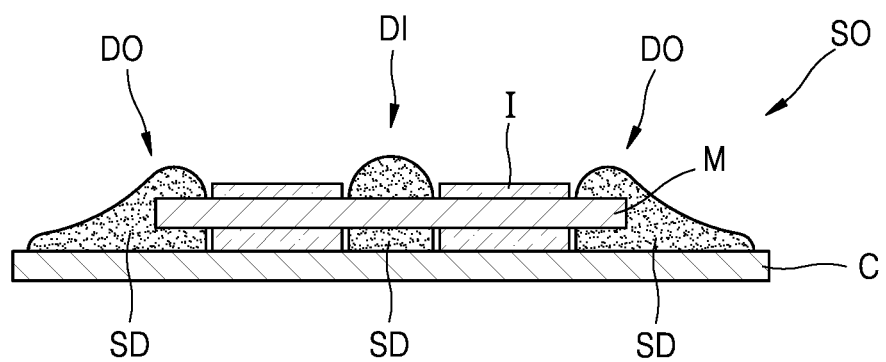
FIG. 8 is a cross-sectional view taken along line VIII-VIII of FIG. 7.

FIG. 7 is an enlarged view illustrating a portion of the connection line S shown in FIG. 6, to show a structure of the board connection pad SO. FIG. 8 is a cross-sectional view taken along line VIII-VIII of FIG. 7.

Referring to the drawings, the board connection pad SO is formed in a shape widening as it goes in a connection direction (corresponding to the direction Z1) of the link line SC from a first end portion E1 connected to the link line SC such that the board connection pad SO may face the circuit board C over a relatively large area. The connection direction (corresponding to the direction Z1) of the link line SC may refer to a direction in which an end portion of the link line SC is connected to the first end portion E1 of the board connection pad SO but may not refer to the extension direction of the entirety of the link line SC having a plurality of curved portions. That is, the connection direction (corresponding to the direction Z1) of the link line SC may refer to the extension direction of the end portion of the link line SC connected to the board connection pad SO or the direction in which the end portion of the link line SC is connected to the board connection pad SO.

The board connection pad SO may include the conductive pattern M and the insulating layer (I) in which the conductive pattern M is embedded, and in the board connection pad SO, the soldering portions DO and DI at which the conductive pattern M is exposed may be formed at positions different from the position of the insulation-covered portion IC at which the conductive pattern M is covered with the insulating layer (I).

The soldering portions DO and DI may be formed by the conductive pattern M exposed from the insulating layer (I) and may be conductively connected to the circuit board C with solder SD therebetween. The insulation-covered portion IC may be a region in which the conductive pattern M is covered with the insulating layer (I) and is thus not directly connected to the circuit board C owing to the insulating layer (I) between the conductive pattern M and the circuit board C.

The board connection pad SO and the circuit board C may be conductively connected to each other by reflow soldering. The reflow soldering may be performed by printing a pattern of solder paste or cream between the board connection pad SO and the circuit board C, performing a high-temperature thermal process to melt the solder paste or cream as molten or half-molten solder SD, and allowing the molten or half-molten solder SD to solidify between the board connection pad SO and the circuit board C for electrical connection between the board connection pad SO and the circuit board C. In the reflow soldering, a pattern of solder paste or cream may be selectively printed on the soldering portions DO and DI of the board connection pad SO at which the conductive pattern M is exposed, and then the solder paste or crease melted as molten or half-molten solder SD through a high-temperature thermal process may form conductive connection between the circuit board C and the soldering portions DO and DI. Even when solder paste or the like is entirely applied between the board connection pad SO and the circuit board C by printing in a reflow soldering process, depending on the wettability or affinity of solder SD, the soldering portions DO and DI at which the conductive pattern M is exposed from the insulating layer (I) may be securely coupled to the circuit board C, but the insulation-covered portion IC at which the conductive pattern M is covered with the insulating layer (I) may be separated or spaced apart from the circuit board C easily by external force instead of being coupled to the circuit board C.

The soldering portions DO and DI may be formed in outer and inner regions of the board connection pad SO. The outer region of the board connection pad SO may refer to a boundary region of the board connection pad SO which includes the first end portion E1 forming a boundary with the link line SC, a slope portion ES sloped from the first end portion E1 to increase the area of the board connection pad SO, a second end portion E2 on a side opposite the first end portion E1 in the connection direction of the link line SC, and third and fourth end portions E3 and E4 between the second end portion E2 and the slope portion ES. In the outer region of the board connection pad SO, the outer soldering portion DO for coupling with the circuit board C may be formed on the second, third, and fourth end portions E2, E3, and E4. That is, the outer soldering portion DO may be formed on the second, third, and fourth end portions E2, E3, and E4 by the conductive pattern M exposed from the insulating layer (I) such that solder SD may be provided between the circuit board C and the outer soldering portion DO. For example, the outer soldering portion DO may be formed by a copper foil pattern having good wettability with solder SD.

The outer soldering portion DO may be formed along the outer region of the board connection pad SO, and more specifically, the outer soldering portion DO may include a plurality of outer soldering portions DO formed on the second, third, and fourth end portions E2, E3, and E4. Since the outer soldering portions DO are formed along the outer region of the board connection pad SO at a plurality of positions, the board connection pad SO and the circuit board C may be easily aligned with each other. For example, in a reflow soldering process, solder SD which is melted to a high temperature may enable self-alignment between the circuit board C (or a pad of the circuit board C) and the outer soldering portions DO according to the wettability of the solder SD, and in this case, the outer soldering portions DO distributed to a plurality of positions along the outer region of the board connection pad SO may have a function of adjusting the position of the board connection pad SO such that the position of the board connection pad SO on the circuit board C may be maintained without deviation. For example, the outer soldering portions DO distributed to a plurality of positions may balance the board connection pad SO and maintain the exact position of the board connection pad SO by balance of force.

The outer soldering portions DO may be formed in a round shape. More specifically, the outer soldering portions DO may be formed in a shape concave toward the outside of the board connection pad SO. More specifically, the outer soldering portions DO may be formed by the conductive pattern M exposed from the insulating layer (I) such that solder SD melted through a high-temperature thermal process may be attached to the outer soldering portions DO, and end portions of the conductive pattern M exposed from the insulating layer (I) may be rounded with respect to the outside to from the outer soldering portions DO. For example, each of the outer soldering portions DO may be formed in a semicircular shape having a center outside the board connection pad SO. For example, in a reflow soldering process, solder SD may be melted in the form of droplets having a spherical shape or a similar shape because of surface tension, and since the outer soldering portions DO making contact with the droplets of solder SD or the end portions of the conductive pattern M forming the outer soldering portions DO are rounded, the contact area between the outer soldering portions DO and the droplets of solder SD may increase. This shape design increasing the contact area between solder SD and the outer soldering portions DO may further facilitate self-alignment of the board connection pad SO and may increase the coupling strength between the board connection pad SO and the circuit board C.

The outer soldering portions DO may be formed at a plurality of positions along the outer region of the board connection pad SO. More specifically, the outer soldering portions DO may be formed at three positions along the second end portion E2 of the board connection pad SO and at one position along each of the third and fourth end portions E3 and E4 of the board connection pad SO.

The most outer soldering portions DO may be formed on the second end portion E2 of the board connection pad SO, and thus high coupling strength may be provided between the circuit board C and the second end portion E2 which is outmost in the connection direction (corresponding to the direction Z1) of the link line SC, such that the board connection pad SO may strongly resist deformation transmitted from the link line SC and may not be separated from the circuit board C due to deformation or force transmitted from the link line SC. For example, the deformation or force transmitted from the link line SC may refer to deformation or force which is transmitted from the link line SC through the first end portion E1 of the board connection pad SO when the link line SC undergoes upward deformation in which a portion of the link line SC or the connection line S is lifted from a main plane.

The most outer soldering portions DO are formed on the second end portion E2 of the board connection pad SO, whereas no outer soldering portion DO is formed on the first end portion E1 of the board connection pad SO and the slope portion ES close to the first end portion E1. That is, the insulation-covered portion IC at which the conductive pattern M is covered with the insulating layer (I) is formed on the first end portion E1 and the slope portion ES of the board connection pad SO, and the first end portion E1 and the slope portion ES at which the insulation-covered portion IC is formed is not directly coupled to the circuit board C. That is, unlike the outer soldering portions DO formed in the outer region other than the first end portion E1 and the slope portion ES, the first end portion E1 and the slope portion ES are not directly coupled to the circuit board C.

This structure is provided by considering the possibility of breakage such as fatigue facture of the first end portion E1 caused by stress excessively accumulated in the first end portion E1 by deformation or repeated vibration of the link line SC when the first end portion E1, to which deformation or force is first transmitted from the link line SC, and the slope portion ES close to the first end portion E1 are firmly coupled to the circuit board C.

No outer soldering portion DO is formed on the first end portion E1 of the board connection pad SO and the slope portion ES close to the first end portion E1, but the insulation-covered portion IC is formed on the first end portion E1 and the slope portion ES, such that the first end portion E1 and the slope portion ES of the board connection pad SO may be spaced apart from the circuit board C when the link line SC undergoes upward deformation. That is, deformation of the link line SC may be absorbed to some degree through lift-off deformation of the insulation-covered portion IC not coupled to the circuit board C, and stress concentrated on the first end portion E1 having the smallest width in the board connection pad SO may be released to some degree.

Since the most outer soldering portions DO are formed on the second end portion E2 which is farthest from the first end portion E1 in the connection direction (corresponding to the direction Z1) of the link line SC, the board connection pad SO may be prevented from be separated from the circuit board C by upward deformation of the link line SC transmitted through the first end portion E1. For example, even when the board connection pad SO is sequentially separated from the circuit board C in the connection direction (corresponding to the direction Z1) of the link line SC due to deformation or repeated vibration transmitted from the first end portion E1 of the board connection pad SO, the board connection pad SO may be prevented from being completely separated from the circuit board C because the most outer soldering portions DO are formed on the second end portion E2. For example, the coupling strength between the board connection pad SO and the circuit board C may increase in a direction from the first end portion E1 toward the second end portion E2, that is, in the connection direction (corresponding to the direction Z1) of the link line SC. However, as described later, although one outer soldering portion DO is formed on each of the third and fourth end portions E3 and E4, that is, the number of outer soldering portions DO formed on the third and fourth end portions E3 and E4 is less than the number of outer soldering portions DO formed on the second end portion E2, the outer soldering portions DO formed on the third and fourth end portions E3 and E4 overlap the inner soldering portion DI (described later) at the same position in the connection direction (corresponding to the direction Z1) of the link line SC (refer to line VIII-VIII) such that the outer soldering portions DO formed on the third and fourth end portions E3 and E4 may provide, in combination with the inner soldering portion DI, the same coupling strength as the coupling strength provided by the outer soldering portions DO formed on the second end portion E2.

The same number of outer soldering portions DO are symmetrically formed on the third and fourth end portions E3 and E4 which are opposite end portions of the board connection pad SO, thereby facilitating self-alignment of the board connection pad SO, guaranteeing balance of force through the symmetric outer soldering portions DO, and making it possible to guide the board connection pad SO to a balanced correct position. For example, one outer soldering portion DO may be formed on each of the third and fourth end portions E3 and E4 of the board connection pad SO, and the number (for example, two) of outer soldering portions DO formed on the third and fourth end portions E3 and E4 may be less than the number (for example, three) of outer soldering portions DO formed on the second end portion E2 which is distant from the third and fourth end portions E3 and E4 in the connection direction (corresponding to the direction Z1) of the link line SC. However, as described later, since the outer soldering portions DO are formed on the third and fourth end portions E3 and E4 at positions overlapping the inner soldering portion DI (refer to VIII-VIII line) in the connection direction (corresponding to the direction Z1) of the link line SC, and thus the outer soldering portions DO formed on the third and fourth end portions E3 and E4 may provide, in combination with the inner soldering portion DI, the same coupling strength as the coupling strength provided by the outer soldering portions DO formed on the second end portion E2. For example, the total number (for example, three) of the inner soldering portion DI and the outer soldering portions DO of the third and fourth end portions E3 and E4 which overlap each other in the connection direction (corresponding to the direction Z1) of the link line SC may be equivalent to the number (for example, three) of the outer soldering portions DO of the second end portion E2.

The gas discharge hole G may be formed in the inner region of the board connection pad SO. For example, a reflow soldering process may be performed by printing a pattern of solder paste or cream mixed with a solvent between the board connection pad SO and the circuit board C and performing a high-temperature thermal process to melt the solder paste or cream as molten solder SD and bond the board connection pad SO and the circuit board C to each other with the solder SD. In this case, the gas discharge hole G may provide a discharge path for volatile gas formed as the solvent mixed with the solder paste or cream evaporates in the high-temperature thermal process.

The gas discharge hole G may be formed in the inner region of the board connection pad SO. Here, the inner region of the board connection pad SO may refer to a region surrounded by the outer region of the board connection pad SO. Since the outer region of the board connection pad SO is directly exposed to outer air, volatile gas may be directly discharged to the outer air even though no additional gas discharge hole G is formed in the outer region. In the inner region of the board connection pad SO, volatile gas may be discharged through the gas discharge hole G. gas which is not discharged from the inner region of the board connection pad SO and remains between the board connection pad SO and the circuit board C may hinder the coupling between the board connection pad SO and the circuit board C and may form defects such as pores while the molten solder SD solidifies, and thus the gas discharge hole G is formed in the inner region of the board connection pad SO to prevent soldering defects and increase the coupling strength between the board connection pad SO and the circuit board C.

The gas discharge hole G may be formed in an elongated shape in one direction, for example, in the connection direction (corresponding to the direction Z1) of the link line SC. As described above, since the gas discharge hole G has an elongated shape in the connection direction (corresponding to the direction Z1) of the link line SC, volatile gas generated at a plurality of positions in the inner region may be easily discharged to the outside. For example, in the outer region of the board connection pad SO, gas may be directly discharged to outer air, and in the inner region of the board connection pad SO, gas may be discharged through the gas discharge hole G extending across the inner region of the board connection pad SO. For example, the gas discharge hole G may be a long hole formed by partially removing both the conductive pattern M and the insulating layer (I) in the connection direction (corresponding to the direction Z1) of the link line SC.

The inner soldering portion DI surrounding the gas discharge hole G may be formed together with the gas discharge hole G in the inner region of the board connection pad SO. The gas discharge hole G may be formed in an rounded oval shape extending in the connection direction (corresponding to the direction Z1) of the link line SC, and the inner soldering portion DI surrounding the gas discharge hole G may make contact with solder SD over a large area and may improve the coupling strength with the circuit board C. For example, the inner soldering portion DI may be formed by the conductive pattern M exposed from the insulating layer (I) such that solder SD melted through a high-temperature thermal process may be attached to the inner soldering portion DI, and a portion of the conductive pattern M exposed from the insulating layer (I) may be formed in one direction in a round shape around the gas discharge hole G to from the inner soldering portion DI. That is, the gas discharge hole G may be formed by partially removing both the insulating layer (I) and the conductive pattern M, and the inner soldering portion DI may be formed around the gas discharge hole G by a portion of the conductive pattern M exposed from the insulating layer (I).

The inner soldering portion DI will now be described in more detail. The inner soldering portion DI may be formed in the inner region of the board connection pad SO. The inner soldering portion DI may be formed in a closed loop shape surrounding the gas discharge hole G. The inner soldering portion DI may be formed by the conductive pattern M exposed from the insulating layer (I) such that solder SD may be provided between the inner soldering portion DI and the circuit board C. For example, the inner soldering portion DI may be formed by a copper foil pattern having good wettability with solder SD.

The inner soldering portion DI may extend in the connection direction (corresponding to the direction Z1) of the link line SC. More specifically, the inner soldering portion DI may extend in the connection direction (corresponding to the direction Z1) of the link line SC such that the inner soldering portion DI may effectively resist deformation tending to separate the board connection pad SO from the circuit board C in the connection direction (corresponding to the direction Z1) of the link line SC. The inner soldering portion DI may have a round shape extending in the connection direction (corresponding to the direction Z1) of the link line SC, and as a whole, the inner soldering portion DI may have an oval shape having a long axis in the connection direction (corresponding to the direction Z1) of the link line SC. Since the inner soldering portion DI has a round shape, the inner soldering portion DI may make contact with a large area of solder SD which is melted in a droplet shape due to surface tension.

The most outer soldering portions DO, that is, three outer soldering portions DO, may be formed on the second end portion E2 of the board connection pad SO, and one outer soldering portion DO may be formed on each other the third and fourth end portions E3 and E4. The inner soldering portion DI may be formed at a position overlapping the outer soldering portions DO of the third and fourth end portions E3 and E4 in the connection direction (corresponding to the direction Z1) of the link line SC (refer to line VIII-VIII), and the inner soldering portion DI and the outer soldering portions DO of the third and fourth end portions E3 and E4 may overlap each other along the same line. In this case, the total number of the inner soldering portion DI and the outer soldering portions DO of the third and fourth end portions E3 and E4 may be equal to the number (for example, three) of the outer soldering portions DO of the second end portion E2.

The board connection pad SO may be formed by the conductive pattern M and the insulating layer (I) covering the conductive pattern M. In this case, the outer soldering portions DO formed in the outer region of the board connection pad SO, and the inner soldering portion DI formed in the inner region of the board connection pad SO may be formed by portions of the conductive pattern M exposed from the insulating layer (I), specifically as a copper foil pattern having high wettability with solder SD. The board connection pad SO, which is a portion of the connection line S connecting the battery cells B and the circuit board C to each other, may be formed in one piece with the connection line S, and the conductive pattern M and the insulating layer (I) of the board connection pad SO may continuously extend from the connection line S (or the link line SC).

Referring to FIGS. 5 and 6, the connection line S may be formed as a flexible printed circuit board (FPCB) in the form of a film including the conductive pattern M and the insulating layer (I) in which the conductive pattern M is embedded. When the distance between the circuit board C and the battery cells B is varied due to vibration or swelling of the battery cells B, the connection line S provided in the form of a film may undergo deformation in which a portion of the connection line S is lifted upward from a main plane, and this upward deformation of the connection line S may mainly occur in the link line SC which is freely connected between the cell connection pad SI and the board connection pad SO other than occurring in the cell connection pad SI and the board connection pad SO which are coupled to the battery cells B and the circuit board C. This upward deformation of the link line SC may be transmitted starting from the first end portion E1 of the board connection pad SO which adjoins the link line SC, to the board connection pad SO in the connection direction (corresponding to the direction Z1) of the link line SC, such that the upward deformation may function as a deformation or force separating the board connection pad SO from the circuit board C.

Referring to FIG. 7, in an embodiment of the present disclosure, no outer soldering portion DO is formed on the first end portion E1 of the board connection pad SO and the slope portion ES close to the first end portion E1, but the insulation-covered portion IC in which the conductive pattern M is covered with the insulating layer (I) is formed on the first end portion E1 and the slope portion ES, such that the first end portion E1 may be spaced apart from the circuit board C when the link line SC undergoes upward deformation. That is, deformation of the link line SC may be absorbed to some degree through lift-off deformation of the insulation-covered portion IC not coupled to the circuit board C, and stress concentrated on the first end portion E1 having the smallest width in the board connection pad SO may be released to some degree.

When an outer soldering portion DO is formed on the first end portion E1 or the slope portion ES of the board connection pad SO, the first end portion E1 or the slope portion ES may excessively resist upward deformation of the link line SC, and stress may be concentrated on the first end portion E1 having the smallest width in the board connection pad SO. As a result, the first end portion E1 may break, for example, due to fatigue fracture caused by repeated upward deformation.

Since the outer soldering portions DO are formed on the third and fourth end portions E3 and E4 and the second end portion E2 which is distant from the first end portion E1 adjoining the link line SC in the connection direction (corresponding to the direction Z1) of the link line SC, the board connection pad SO may be securely coupled to the circuit board C without being separated from the circuit board C by upward deformation of the link line SC. In this case, since the inner soldering portion DI is formed in the inner region of the board connection pad SO which overlaps the third and fourth end portions E3 and E4, the inner soldering portion DI may be securely coupled to the circuit board C together with the outer soldering portions DO of the third and fourth end portions E3 and E4, and since the inner soldering portion DI extends in the connection direction (corresponding to the direction Z1) of the link line SC, the inner soldering portion DI may effectively resist upward deformation of the link line SC.

The inner soldering portion DI and the outer soldering portions DO of the third and fourth end portions E3 and E4 are formed at positions overlapping each other in the connection direction (corresponding to the direction Z1) of the link line SC (refer to line VIII-VIII), and the outer soldering portions DO of the third and fourth end portions E3 and E4 and the inner soldering portion DI may provide high coupling strength with respect to the circuit board C together with the outer soldering portions DO formed on the second end portion E2. For example, one outer soldering portion DO formed on each of the third and fourth end portions E3 and E4 and the inner soldering portion DI may provide the same coupling strength as the coupling strength provided by three outer soldering portions DO formed on the second end portion E2.

In the embodiment of the present disclosure shown in FIG. 7, the board connection pad SO may include: the conductive pattern M through battery cell state information is transmitted; and the insulating layer (I) in which the conductive pattern M is embedded and insulated. In this case, the conductive pattern M may be formed as an one-piece conductive pattern connected to all the outer soldering portions DO and the inner soldering portion DI of the board connection pad SO.

In an embodiment of the present disclosure, a reflow soldering process may be performed by printing a pattern of solder paste or cream between the circuit board C and the board connection pad SO, melting the solder paste or cream as molten solder SD through a high-temperature thermal process, and coupling the circuit board C and the board connection pad SO to each other by solidifying the molten solder SD, and the outer soldering portions DO and the inner soldering portion DI may be formed in a round shape to increase a contact area with solder SD melted in the form of droplets due to surface tension.

The outer soldering portions DO and the inner soldering portion DI may be formed by the conductive pattern M exposed from the insulating layer (I), and the expression "the outer soldering portions DO and the inner soldering portion DI are formed in a round shape" may mean that end portions of the conductive pattern M to be in contact with solder SD melted in the form of droplets are formed in a round shape.

For example, the outer soldering portions DO and the inner soldering portion DI may be formed by the conductive pattern M exposed form the insulating layer (I), and end portions of the conductive pattern M may be formed in a round shape. In this case, portions of the insulating layer (I) adjoining the outer soldering portions DO and the inner soldering portion DI may define the outer soldering portions DO and the inner soldering portion DI and may define contact regions with droplets of solder SD, and may be formed in a round shape by considering contact with droplets of solder SD. For example, the outer soldering portions DO and the inner soldering portion DI may be formed by end portions of the conductive pattern M exposed from the round portions of the insulating layer (I), and in this case, the end portions of the conductive pattern M may be formed in a round shape. As a result, end portions of the insulating layer (I) adjoining the outer soldering portions DO and the inner soldering portion DI, and the end portions of the conductive pattern M forming the outer soldering portions DO and the inner soldering portion DI may have a round shape.

A plurality of circuit elements (not shown) may be mounted on the circuit board C to collect state information from battery cells and control the charge-discharge operations of the battery cells based on the collected state information, and all the circuit elements (not shown) may be conductively connected to the circuit board C in the reflow soldering process of the board connection pad SO. That is, in an embodiment of the present disclosure, coupling between the circuit board C and circuit elements (not shown), and coupling between the circuit board C and the board connection pad SO may be simultaneously performed through a single reflow soldering process.

In a comparative example for comparison with the present disclosure, coupling between the board connection pad SO and the circuit board C may be performed through a process such as a hot-bar process requiring separate manufacturing equipment which is separate from a process (for example, a reflow soldering process) for coupling circuit elements to the circuit board C. That is, according to embodiments of the present disclosure, the number and complexity of manufacturing processes may be reduced by performing two different coupling tasks through a single process (for example, a reflow soldering process), and thus manufacturing costs may be efficiently used.

Figure 9:
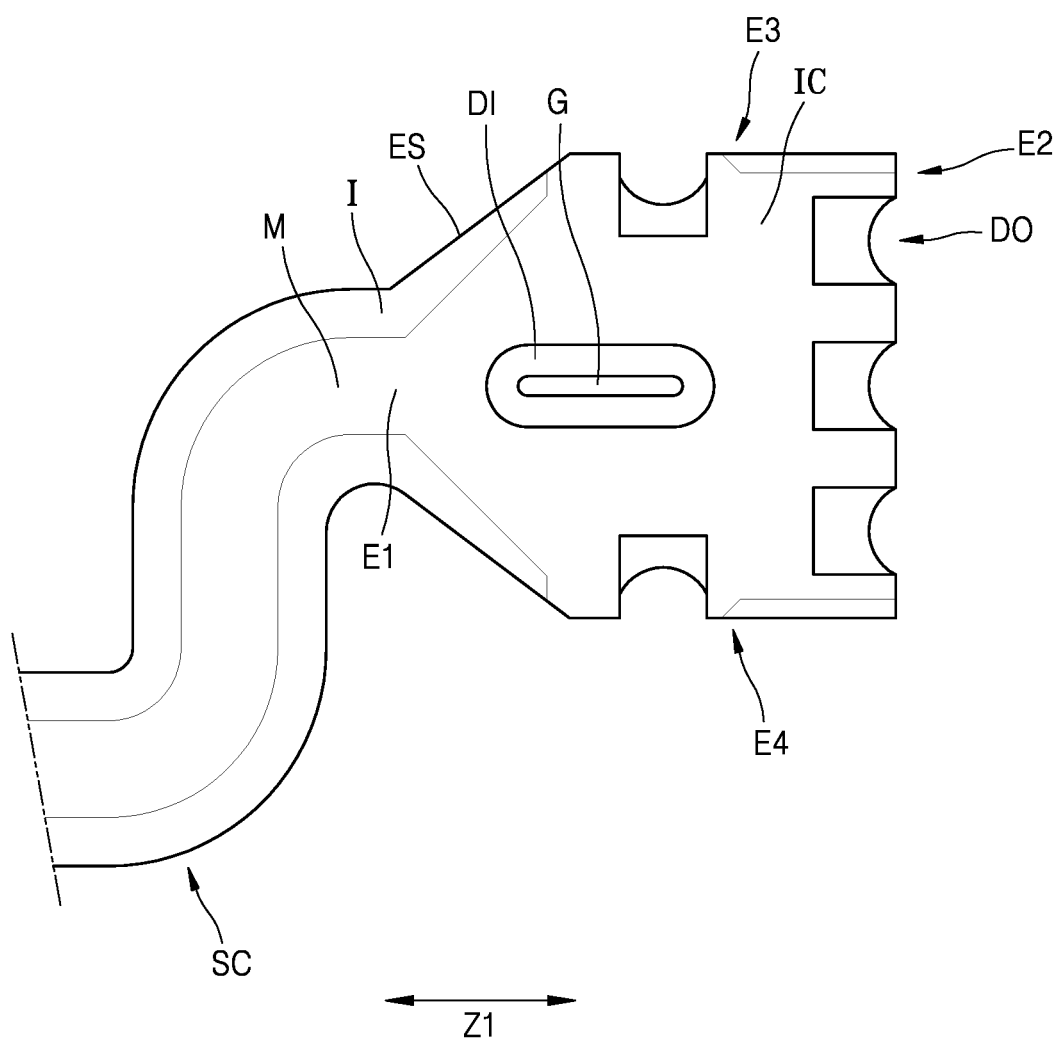
FIG. 9 is a view illustrating a board connection pad applicable to another embodiment of the present disclosure.

FIG. 9 is a view illustrating a board connection pad SO applicable to another embodiment of the present disclosure.

Referring to the drawing, the board connection pad SO may include: a conductive pattern M through which state information about battery cells B is transmitted; and an insulating layer I in which the conductive pattern M is embedded. In addition, the board connection pad SO may include outer soldering portions DO and an inner soldering portion DI which are formed by portions of the conductive pattern M exposed from the insulating layer (I) for being coupled to the circuit board C with solder SD therebetween. The outer soldering portions DO and the inner soldering portion DI may be formed in a round shape for smooth contact with droplets of molten solder SD. In this case, portions of the insulating layer (I) adjoining the outer soldering portions DO and the inner soldering portion DI may define the outer soldering portions DO and the inner soldering portion DI and may define contact regions with droplets of solder SD. In the present embodiment, sufficient areas of the conductive pattern M may be exposed from the insulating layer (I) to form sufficient contact areas between solder SD and the outer soldering portions DO and the inner soldering portion DI, and to this end, the insulating layer (I) may be sufficiently recessed from end portions of the conductive pattern M. In the present embodiment, sufficient areas of the conductive pattern M may be exposed from the insulating layer (I), and end portions of the insulating layer (I) may be formed in an angled shape instead of a round shape as long as exposed portions of the conductive pattern M make contact with solder SD over sufficiently large areas.

Figure 10:
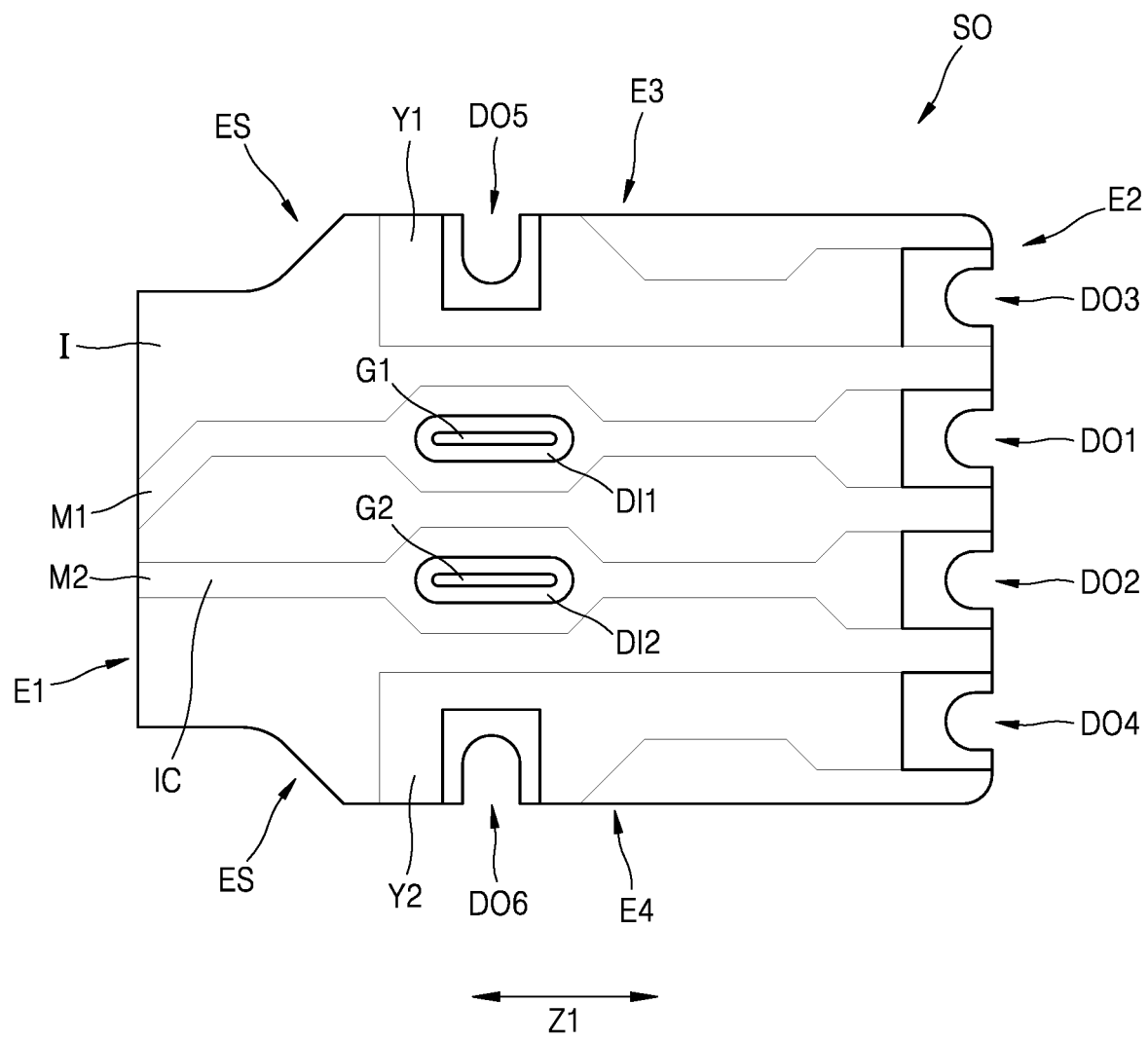
FIG. 10 is a view illustrating a board connection pad applicable to another embodiment of the present disclosure.

FIG. 10 is a view illustrating a board connection pad SO applicable to another embodiment of the present disclosure.

Referring to the drawing, the board connection pad SO may include an outer region as a boundary between the board connection pad SO and the outside, and an inner region surrounded by the outer region. The board connection pad SO may be coupled to the circuit board C through outer soldering portions DO1 to DO6 formed in the outer region and inner soldering portions DI1 and DI2 formed in the inner region.

The outer region of the board connection pad SO may include: a first end portion E1 forming a boundary with the link line SC; a slope portion ES sloped from the first end portion E1 to increase the area of the board connection pad SO; a second end portion E2 on a side opposite the first end portion E1 in the connection direction (corresponding to the direction Z1) of the link line SC; and third and fourth end portions E3 and E4 between the second end portion E2 and the slope portion ES.

In the present embodiment, first to fourth outer soldering portions DO1, DO2, DO3, and DO4 may be formed on the second end portion E2, and fifth and sixth outer soldering portions DO5 and DO6 may be respectively formed on the third and fourth end portions E3 and E4. In addition, first and second gas discharge holes G1 and G2 may be formed in the inner region of the board connection pad SO, and first and second inner soldering portions DI1 and DI2 may be formed respectively around the first and second gas discharge holes G1 and G2.

Each of the first to sixth outer soldering portions DO1 to DO6 may be concave toward the outside of the board connection pad SO and may have a semicircular shape having a center outside the board connection pad SO. In addition, the first and second gas discharge holes G1 and G2, and the first and second inner soldering portions DI1 and DI2 respectively surrounding the first and second gas discharge holes G1 and G2 may be rounded in an oval shape extending in the connection direction (corresponding to the direction Z1) of the link line SC.

In the present embodiment, the board connection pad SO may include: conductive patterns M1 and M2 through which state information about battery cells B is transmitted; isolated patterns Y1 and Y2 through which state information about battery cells B is not transmitted; and an insulating layer (I) in which all the conductive patterns M1 and M2 and the isolated patterns Y1 and Y2 are embedded. The isolated patterns Y1 and Y2 may not transmit state information of battery cells B and may be isolated from the conductive patterns M1 and M2 without an electrical signal transmission function, and as described later, the isolated patterns Y1 and Y2 may include the third to sixth outer soldering portions DO3 to DO6 as structure for providing coupling strength with reference to the circuit board C. However, the conductive patterns M1 and M2 may have a transmission function for transmitting an electrical signal containing state information about battery cells B, and the conductive patterns M1 and M2 may also have a structural function for providing coupling strength with respect to the circuit board C by including the first and second outer soldering portions DO1 and DO2 and the first and second inner soldering portions DI1 and DI2.

More specifically, the conductive patterns M1 and M2 may include: a first conductive pattern M1 which connects the first outer soldering portion DO1 formed on the second end portion E2 to the first inner soldering portion DI1 surrounding the first gas discharge hole G1 formed in the inner region; and a second conductive pattern M2 which connects the second outer soldering portion DO2 formed on the second end portion E2 to the second inner soldering portion DI2 surrounding the second gas discharge hole G2 formed in the inner region.

The isolated patterns Y1 and Y2 may include: a first isolated pattern Y1 which connects the third outer soldering portion DO3 formed on the second end portion E2 to the fifth outer soldering portion DO5 formed on the third end portion E3; and a second isolated pattern Y2 which connects the fourth outer soldering portion DO4 formed on the second end portion E2 to the sixth outer soldering portion DO6 formed on the fourth end portion E4.

The first and second conductive patterns M1 and M2 may transmit state information about the same battery cell B and may be electrically connected to each other. For example, the first and second conductive patterns M1 and M2 may be connected to each other in the board connection pad SO, or even when the first and second conductive patterns M1 and M2 are separated from each other in the board connection pad SO, the first and second conductive patterns M1 and M2 may be connected to each other in the link line SC. In addition, the first and second isolated patterns Y1 and Y2 are formed on the board connection pad SO in an isolated state and may not extend to the link line SC.

In the embodiment shown in FIG. 10, the isolated patterns Y1 and Y2 which do not have a signal transmission function may be formed in addition to the conductive patterns M1 and M2 to increase the coupling strength between the board connection pad SO and the circuit board C, such that the coupling strength between the board connection pad SO and the circuit board C may be increased by the isolation patterns Y1 and Y2 without being limited to the minimum width of the first end portion E1. For example, the isolated patterns Y1 and Y2 are formed only on the board connection pad SO and do not extend to the connection line SC, and even when the areas of the isolated patterns Y1 and Y2 are increased, the width of the first end portion E1 connected to the link line SC may not be affected by the isolated patterns Y1 and Y2.

The first conductive pattern M1 and the first isolated pattern Y1 may be symmetric with the second conductive pattern M2 and the second isolated pattern Y2 with respect to a center line of the board connection pad SO such that the board connection pad SO may be guided to a balanced correct position for facilitating self-alignment.

In the present embodiment, no soldering portion is formed on the first end portion E1 adjoining the link line SC and the slope portion ES adjoining the first end portion E1, and an insulation-covered portion IC in which the conductive patterns M1 and M2 are covered with the insulating layer (I) is formed at the first end portion E1 and the slope portion ES such that when upward deformation of the link line SC is transmitted to the first end portion E1, the first end portion E1 and the slope portion ES adjacent to the first end portion E1 may be deformed off the circuit board C according to the upward deformation of the link line SC to absorb the upward deformation of the link line SC to some degree and lower stress concentrated on the first end portion E1 forming the minimum width of the board connection pad SO.

The fifth and sixth outer soldering portions DO5 and DO6 may be respectively formed on the third and fourth end portions E3 and E4 at positions overlapping the first and second inner soldering portions DI1 and DI2 in the connection direction (corresponding to the direction Z1) of the link line SC, and thus the total number (for example, four) of the fifth and sixth outer soldering portions DO5 and DO6 and the first and second inner soldering portions DI1 and DI2 may be equal to the total number (for example, four) of the first to fourth outer soldering portions DO1 to DO4 formed on the second end portion E2 such that the fifth and sixth outer soldering portions DO5 and DO6 and the first and second inner soldering portions DI1 and DI2 may provide the same coupling strength as the first to fourth outer soldering portions DO1 to DO4 formed on the second end portion E2.

Figure 11:
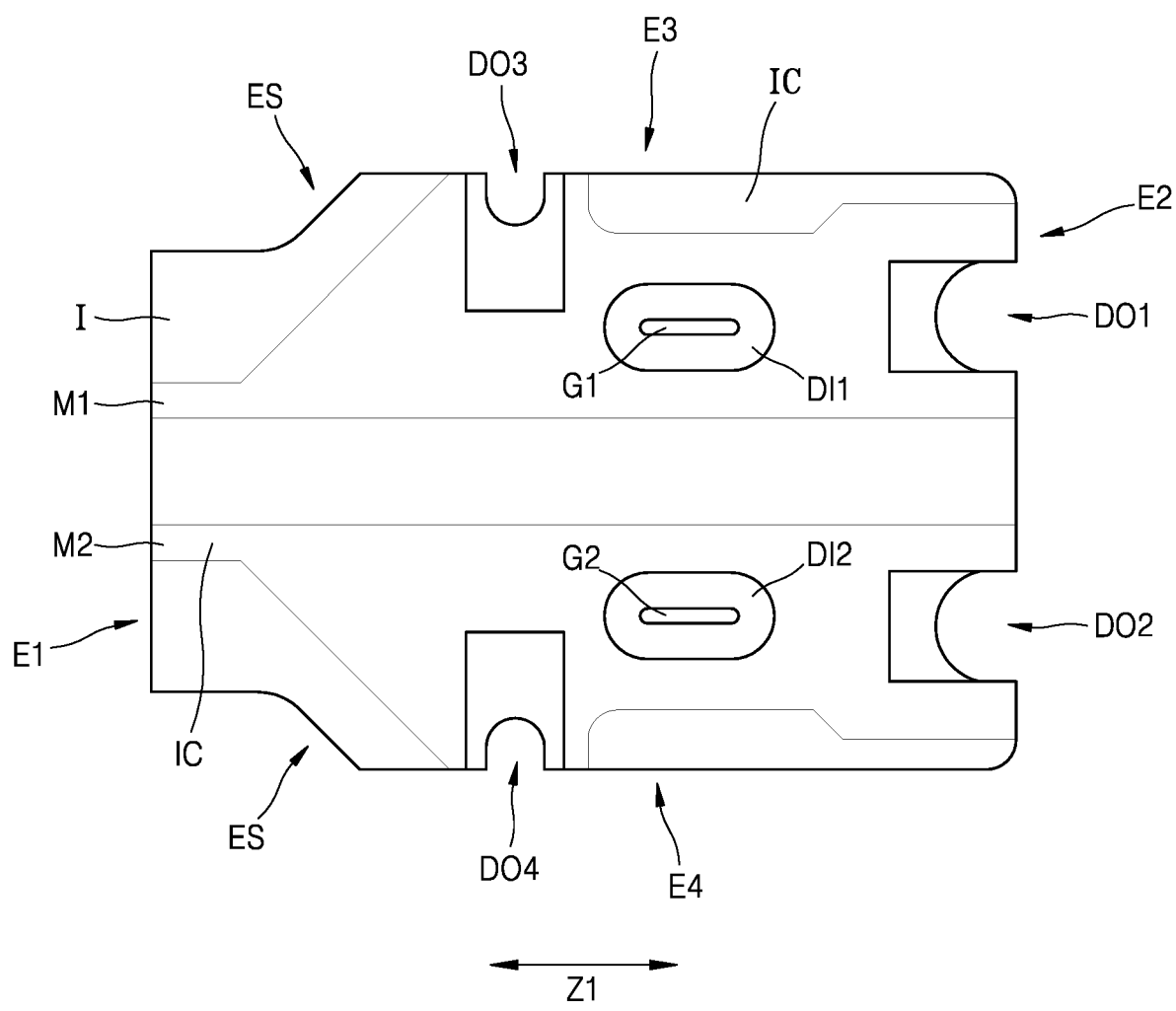
FIG. 11 is a view illustrating a board connection pad applicable to another embodiment of the present disclosure.

FIG. 11 is a view illustrating a board connection pad SO applicable to another embodiment of the present disclosure.

Referring to the drawing, the board connection pad SO may include an outer region as a boundary between the board connection pad SO and the outside, and an inner region surrounded by the outer region. The board connection pad SO may be coupled to the circuit board C through outer soldering portions DO1, DO2, DO3, and DO4 formed in the outer region and inner soldering portion DI1 and DI2 formed in the inner region.

The outer region of the board connection pad SO may include: a first end portion E1 forming a boundary with the link line SC; a slope portion ES sloped from the first end portion E1 to increase the area of the board connection pad SO; a second end portion E2 on a side opposite the first end portion E1 in the connection direction (corresponding to the direction Z1) of the link line SC; and third and fourth end portions E3 and E4 between the second end portion E2 and the slope portion ES.

In the present embodiment, first and second soldering portions DO1 and DO2 may be formed on the second end portion E2, and third and fourth outer soldering portions DO3 and DO4 may be respectively formed on the third and fourth end portions E3 and E4. In addition, first and second gas discharge holes G1 and G2 may be formed in the inner region of the board connection pad SO, and first and second inner soldering portions DI1 and DI2 may be formed respectively around the first and second gas discharge holes G1 and G2.

Each of the first to fourth outer soldering portions DO1 to DO4 may be concave toward the outside of the board connection pad SO and may have a semicircular shape having a center outside the board connection pad SO. In addition, the first and second gas discharge holes G1 and G2, and the first and second inner soldering portions DI1 and DI2 respectively surrounding the first and second gas discharge holes G1 and G2 may be rounded in an oval shape extending in the connection direction (corresponding to the direction Z1) of the link line SC.

In the present embodiment, the board connection pad SO may include: conductive patterns M1 and M2 through which state information about battery cells B is transmitted; and an insulating layer (I) in which the conductive patterns M1 and M2 are embedded, wherein the conductive patterns M1 and M2 may include first and second conductive patterns M1 and M2 separated from each other.

More specifically, the first conductive pattern M1 may connect together the first outer soldering portion DO1 formed on the second end portion E2, the third outer soldering portion DO3 formed on the third end portion E3, and the first inner soldering portion DI1 surrounding the first gas discharge hole G1 formed in the inner region.

The second conductive pattern M2 may connect together the second outer soldering portion DO2 formed on the second end portion E2, the fourth outer soldering portion DO4 formed on the fourth end portion E4, and the second inner soldering portion DI2 surrounding the second gas discharge hole G formed in the inner region.

The first and second conductive patterns M1 and M2 may transmit state information about the same battery cell B and may be electrically connected to each other. For example, the first and second conductive patterns M1 and M2 may be connected to each other in the board connection pad SO, or even when the first and second conductive patterns M1 and M2 are separated from each other in the board connection pad SO, the first and second conductive patterns M1 and M2 may be connected to each other in the link line SC.

In the embodiment shown in FIG. 11, the conductive patterns M1 and M2 are not formed over the entire area of the board connection pad SO but are formed to be separate from each other based on a center line of the board connection pad SO, thereby reducing the areas of the conductive patterns M1 and M2 and material costs. The first and second conductive patterns M1 and M2 may be symmetric with respect to the center line of the board connection pad SO such that the board connection pad SO may be guided to a balanced correct position for facilitating self-alignment.

In the present embodiment, no soldering portion is formed on the first end portion E1 connected to the link line SC and the slope portion ES adjoining the first end portion E1, and an insulation-covered portion IC in which the conductive patterns M1 and M2 are covered with the insulating layer (I) is formed at the first end portion E1 and the slope portion ES such that when upward deformation of the link line SC is transmitted to the first end portion E1, the first end portion E1 and the slope portion ES adjacent to the first end portion E1 may be deformed off the circuit board C according to the upward deformation of the link line SC to absorb the upward deformation of the link line SC to some degree and lower stress concentrated on the first end portion E1 forming the minimum width of the board connection pad SO.

The third and fourth outer soldering portions DO3 and DO4 may be respectively formed on the third and fourth end portions E3 and E4 at overlapping positions in the connection direction (corresponding to the direction Z1) of the link line SC, and the first and second inner soldering portions DI1 and DI2 surrounding the first and second gas discharge holes G1 and G2 may also be formed at overlapping positions in the connection direction (corresponding to the direction Z1) of the link line SC. That is, the total number (for example, two) of the third and fourth outer soldering portions DO3 and DO4 respectively formed on the third and fourth end portions E3 and E4 is equal to the total number (for example, two) of the first and second inner soldering portions DI1 and DI2 and the total number (for example, two) of the first and second outer soldering portions DO1 and DO2 formed on the second end portion E2. Therefore, although no soldering portion is formed on the first end portion E1 and the slope portion ES of the board connection pad SO, the third and fourth outer soldering portions DO3 and DO4, which overlap each other at positions apart from the first end portion E1 in the connection direction (corresponding to the direction Z1) of the link line SC, may provide coupling strength which is equivalent to coupling strength provided by the first and second inner soldering portions DI1 and DI2 overlapping each other and is equivalent to coupling strength provided by the first and second outer soldering portions DO1 and DO2 formed on the second end portion E2 which is farthest from the first end portion E1.

In the embodiment shown in FIG. 11, the third and fourth outer soldering portions DO3 and DO4 formed on the third and fourth end portions E3 and E4 may not overlap the first and second inner soldering portions DI1 and DI2 in the connection direction (corresponding to the direction Z1) of the link line SC. In addition, the total number (for example, two) of the third and fourth outer soldering portions DO3 and DO4 formed on the third and fourth end portions E3 and E4, the total number (for example, two) of the first and second inner soldering portions DI1 and DI2, and the total number (for example, two) of the first and second outer soldering portions DO1 and DO2 formed on the second end portion E2 may be equal to each other.

While embodiments of the present disclosure have been described with reference to the accompanying drawings, the embodiments are for illustrative purposes only, and it will be understood by those of ordinary skill in the art that various modifications and equivalent other embodiments may be made therefrom.

INDUSTRIAL APPLICABILITY

The present disclosure may be applied to battery packs which are rechargeable energy sources.

The invention claimed is:

1. A battery pack comprising:
a battery cell;
a circuit board configured to collect state information relating to the battery cell; and
a connection line configured to transmit the state information to the circuit board and comprising a link line and a board connection pad, wherein the link line extends from a side of the battery cell toward the circuit board, and wherein the board connection pad extends from a first end portion, to which the link line is connected, and is coupled to the circuit board while facing the circuit board,
wherein the board connection pad comprises:
a plurality of outer soldering portions formed in an outer region of the board connection pad and concave toward the outside of the board connection pad;
a gas discharge hole formed in a closed loop shape in an inner region of the board connection pad; and
an inner soldering portion formed along the gas discharge hole.

2. The battery pack of claim 1, wherein the board connection pad comprises:
a conductive pattern through which the state information is transmitted; and
an insulating layer in which the conductive pattern is embedded for insulating the conductive pattern.

3. The battery pack of claim 2, wherein the outer soldering portions and the inner soldering portion are formed by the conductive pattern exposed from the insulating layer.

4. The battery pack of claim 2, wherein the conductive pattern comprises a one-piece conductive pattern connected to all the outer soldering portions and the inner soldering portion formed on the board connection pad.

5. The battery pack of claim 1, wherein each of the outer soldering portions is formed in a semicircular shape having a center outside the board connection pad.

6. The battery pack of claim 1, wherein the inner region is surrounded by the outer region and is separated from the outside of the board connection pad.

7. The battery pack of claim 1, wherein the gas discharge hole is formed in an elongated shape in the inner region of the board connection pad in a connection direction of the link line.

8. The battery pack of claim 7, wherein the gas discharge hole is formed in an oval shape having a long axis in the connection direction of the link line.

9. The battery pack of claim 1, wherein the outer region of the board connection pad comprises:
the first end portion;
a slope portion sloped from the first end portion to increase an area of the board connection pad;
a second end portion on a side opposite the first end portion in a connection direction of the link line; and
a third end portion and a fourth end portion which connect the second end portion and the slope portion to each other.

10. The battery pack of claim 9, wherein the outer soldering portions are formed on the second end portion, the third end portion, and the fourth end portion.

11. The battery pack of claim 9, wherein in the first end portion and the slope portion, an insulation-covered portion in which a conductive pattern of the board connection pad is covered with an insulating layer is formed.

12. The battery pack of claim 9, wherein two or more of the outer soldering portions are formed on the second end portion.

13. The battery pack of claim 9, wherein the outer soldering portions comprise at least one first outer soldering portion and at least one second outer soldering portion respectively formed on the third and fourth end portions, and wherein the at least one first outer soldering portion and the at least one second outer soldering portion are symmetric to each other.

14. The battery pack of claim 9, wherein a first number of the outer soldering portions are formed on the third and fourth end portions and a second number of the outer soldering portions are formed on the second end portion, and wherein the first number is less than the second number.

15. The battery pack of claim 9, wherein the outer soldering portions comprise two or more outer soldering portions formed on the third and fourth end portions and overlapping the inner soldering portion in the connection direction of the link line.

16. The battery pack of claim 15, wherein a first number of the outer soldering portions are formed on the third and fourth end portions, wherein the board connection pad comprises a third number of the inner soldering portion wherein a second number of the outer soldering portions are formed on the second end portion, and wherein the sum of the first and third numbers is equal to the second number.

17. The battery pack of claim 9, wherein the outer soldering portions comprise two or more outer soldering portions formed on the third and fourth end portions and not overlapping the inner soldering portion in the connection direction of the link line.

18. The battery pack of claim 17, wherein a first number of the outer soldering portions are formed on the third and fourth end portions, wherein the board connection pad comprises a third number of the inner soldering portion, wherein a second number of the outer soldering portions are formed on the second end portion, and wherein each of the first and third numbers is equal to the second number.

19. The battery pack of claim 9, wherein the board connection pad comprises a conductive pattern through which the state information relating to the battery cell is transmitted and an isolated pattern through which the state information is not transmitted, and
wherein the conductive pattern comprises:
a first conductive pattern which connects a first outer soldering portion formed on the second end portion to a first inner soldering portion surrounding a first gas discharge hole in the inner region; and
a second conductive pattern which connects a second outer soldering portion formed on the second end portion to a second inner soldering portion surrounding a second gas discharge hole in the inner region,
wherein the isolated pattern comprises:
a first isolated pattern which connects a third outer soldering portion formed on the second end portion to a fifth outer soldering portion formed on the third end portion; and a second isolated pattern which connects a fourth outer soldering portion formed on the second end portion to a sixth outer soldering portion formed on the fourth end portion.

20. The battery pack of claim 9, wherein the board connection pad comprises a conductive pattern through which the state information is transmitted, and the conductive pattern comprises first and second conductive patterns separate from each other, wherein the first conductive pattern connects together a first outer soldering portion formed on the second end portion, a third outer soldering portion formed on the third end portion, and a first inner soldering portion surrounding a first gas discharge hole in the inner region, and wherein the second conductive pattern connects together a second outer soldering portion formed on the second end portion, a fourth outer soldering portion formed on the fourth end portion, and a second inner soldering portion surrounding a second gas discharge hole in the inner region.

\* \* \* \* \*